United States Patent
Fukunaga

[11] Patent Number: 5,837,072
[45] Date of Patent: Nov. 17, 1998

[54] SOLID TIRE

[75] Inventor: Muneyasu Fukunaga, Osaka, Japan

[73] Assignee: Fukunaga Engineering Co., Ltd., Osaka, Japan

[21] Appl. No.: 766,614

[22] Filed: Dec. 13, 1996

[30] Foreign Application Priority Data

Aug. 22, 1996 [JP] Japan ..................................... 8-221282
Nov. 6, 1996 [JP] Japan ..................................... 8-293866

[51] Int. Cl.⁶ .................................................. B60C 07/10
[52] U.S. Cl. ........................... 152/312; 152/319; 152/158
[58] Field of Search .................................... 152/313, 319, 152/310, 311, 312, 314, 318, 323, 324, 157, 158, 520

[56] References Cited

U.S. PATENT DOCUMENTS

| | | | |
|---|---|---|---|
| 1,035,473 | 8/1912 | Rovelli | 152/312 |
| 1,076,024 | 10/1913 | Culp | 152/312 |
| 4,334,565 | 6/1982 | Stokes | 152/313 X |

FOREIGN PATENT DOCUMENTS

| | | |
|---|---|---|
| 28271 | 2/1925 | France . |
| 1390440 | 1/1965 | France . |
| 2532591 | 3/1984 | France . |
| 3008972 | 9/1981 | Germany . |
| 1-262206 | 10/1989 | Japan . |
| 16579 | 12/1915 | United Kingdom . |

*Primary Examiner*—Francis J. Lorin
*Attorney, Agent, or Firm*—Wenderoth, Lind & Ponack, L.L.P.

[57] ABSTRACT

A solid tire which is high in load-bearing capacity, while maintaining as high a resilience as a conventional hollow tire, and capable of sufficiently absorbing shocks while the vehicle is traveling with no cargo. It has an annular rubber member fitted in a rim of a wheel, and a tire fitted on the annular rubber member around its outer periphery. The annular rubber member has a groove formed in the outer surface thereof so as to extend along a ridge circling the outer surface of the annular rubber member. The groove expands axially of the tire toward the rim. When a small, impulsive load is applied to the annular rubber member, its portions on both sides of the groove are resiliently bent to absorb the load. When a larger load is applied continuously for a long time, the entire annular rubber member is resiliently compressed to bear the load.

16 Claims, 7 Drawing Sheets

SOLID TIRE

BACKGROUND OF THE INVENTION

This invention relates to a solid tire having a solid resilient cushion member disposed between a tire and a wheel.

Solid tires are free of air leakage or puncture. One conventional solid tire has a resilient rubber member integral with a tire and secured to a wheel rim, and another has a resilient member stuffed in a tubeless tire.

Since solid tires have a resilient member made of a material having a high load bearing capacity, such as a synthetic rubber, and retained in the tire, one big advantage of such solid tires over traditional hollow air tires is that they are free of air leakage or puncture. They are mainly used for vehicles for transporting heavy loads and/or in applications where puncture mending is difficult.

Such solid tires have however a problem in that, because they are manufactured by mounting or stuffing a resilient member having predetermined compression deformability in the tire, it is impossible to adjust the resilience of the tire by adjusting air pressure like hollow tires. Such solid tires cannot sufficiently absorb shocks from the road surface, such as when a heavy load-carrying vehicle is traveling with no load, thus causing various troubles such as increased fatigue of the driver.

The inventor of the present application proposed in Examined Japanese Patent Publication 8-22641 a tired wheel having the tire directly mounted on the wheel rim. The tire has a plurality of resilient annular members uprising inwardly from both sides of the outer periphery of the wheel rim, circumferentially spaced from each other. Each annular member is thinner in a radial direction at its portion nearer to the outer periphery of the rim.

When a relatively small shock or load is applied to this tired wheel, the annular portions are deformed at their thinner portions, i.e. portions near the ridge of the rim to absorb shocks. Larger shocks and loads are absorbed by the deformation of the thick portions near the bottom of the rim.

In this conventional arrangement, shocks are absorbed solely by the deformation of the resilient annular members. Selection of the material for the resilient members is thus difficult if the solid tire is used under high load conditions. This solid tire can be used with compressed air charged therein if desired. But in this case, the tire may suffer air leakage or puncture.

An object of this invention is to provide a puncture-free solid tire which is high in load-bearing capacity, while maintaining as high a resilience as a conventional hollow tire, and capable of sufficiently absorbing shocks even while the vehicle is traveling with no cargo, thereby relieving the driver of fatigue.

SUMMARY OF THE INVENTION

According to this invention, there is provided a solid tire comprising an annular rubber member fitted on a rim of a wheel, and a tire fitted on the annular rubber member around its outer periphery, the annular rubber member having an annular groove formed in outer periphery thereof so as to extend along a ridge circling the outer periphery of the annular rubber member, the groove expanding at an inner end thereof.

The tire has an annular rib formed on the inner surface thereof so as to be received in the groove.

There is also provided a solid tire comprising an annular rubber member fitted on a rim of a wheel, and a tire fitted on the annular rubber member around its outer periphery. The annular rubber member has a slit formed in the outer surface thereof so as to extend along a ridge circling the outer surface of the annular rubber member.

Further, there is provided a solid tire comprising an annular rubber member fitted on a rim of a wheel, and a tire fitted on the annular rubber member around its outer periphery. The annular rubber member has an annular hollow circling through the annular rubber member at a position nearer to the rim or the tire so that the annular rubber member is thinner at its portion nearer to the rim or the tire than at its portion nearer to the tire or the rim.

One of the annular rubber member and the tire has a plurality of recesses formed in the outer or inner surface thereof, spaced circumferentially from each other, and the other has protrusions formed on the outer or inner surface thereof so as to be received in the respective recesses.

Also, there is provided a solid tire comprising an annular rubber member fitted on a rim of a wheel, and a tread integrally formed on the radially outer periphery of the annular rubber member. The annular rubber member has annular hollow circling through the annular rubber member at a position nearer to the rim or the tread so that the annular rubber member is thinner at its portion nearer to the rim or the tread than at its portion nearer to the tread or the rim.

In the arrangement in which the tire is fitted around the annular rubber member fitted on the rim of a wheel, it is possible to replace only the tire when its tread wears out. This solid tire is thus economically advantageous over conventional integrally molded solid tires.

In the arrangement in which the groove expands axially of the tire toward the rim, when a load is applied to the annular rubber member along its outer peripheral ridge, its portions on both sides of the groove are resiliently bent toward each other.

By moving toward each other or coming into contact with each other, these portions absorb shocks or loads applied to the solid tire. When a larger load is applied to the annular rubber member along its outer ridge, the entire annular rubber member is resiliently bent toward the deeper part of the groove, and compressed simultaneously.

When a small, impulsive load is applied, the portions of the annular rubber member on both sides of the groove are resiliently deformed to absorb the load. When a larger load is applied continuously for a long time, the entire annular rubber is compressed in the tire to absorb such a load.

In the arrangement in which the annular rubber member has a slit formed in the outer surface thereof so as to extend along a ridge circling the outer surface of the annular rubber member, when a small load is applied to the annular rubber member and the annular rubber member is deformed, the slit will open, creating a gap in the rubber member. The load is thus borne softly by the rubber member. When a larger load is applied, the entire annular rubber member is compressed to bear the load.

In the arrangement in which the annular rubber member has an annular hollow circling through the annular rubber member at a position nearer to the rim or the tread of the tire so that the annular rubber member is thinner at its portion nearer to the rim or the tread than at its portion nearer to the tread or the rim, when a small load is applied, its thin portion nearer to the rim or the tread is resiliently deformed to absorb the load. When a larger load is applied, the entire annular rubber member is compressed in the tire to bear the load.

Thus, any of the solid tires of the present invention can softly bear a small load and a larger load with increased rigidity.

By using an annular rubber member splittable in the axial direction of the tire, the solid tire can be assembled easily. The wire mesh embedded in the annular rubber member increases the strength of the rubber member.

The rib provided on the tire so as to be received in the groove of the annular rubber member prevents axial displacement of the annular rubber member.

By engaging a plurality of protrusions formed on one of the annular rubber member and the tire in recesses formed in the other of the annular rubber member and the tire, it is possible to prevent the annular member from displacing relative to the tire and thus to prevent friction therebetween and the production of frictional heat.

Other features and objects of the present invention will become apparent from the following description made with reference to the accompanying drawings, in which:

DETAILED DESCRIPTION OF THE PREFERRED EMBODIMENT

Embodiments of the present invention will now be described with reference to the accompanying drawings.

The solid tire A of the first embodiment, shown in FIGS. 1–3B, has an annular rubber member 3 fitted on a rim 2 of a wheel 1, and a hollow rubber tire 4 fitted on the rubber member 3. The annular rubber member 3 has a peripheral groove 5 circumferentially extending along the outer periphery thereof. The inner end portion of the groove 5 expands toward the rim 2.

Figure 1:
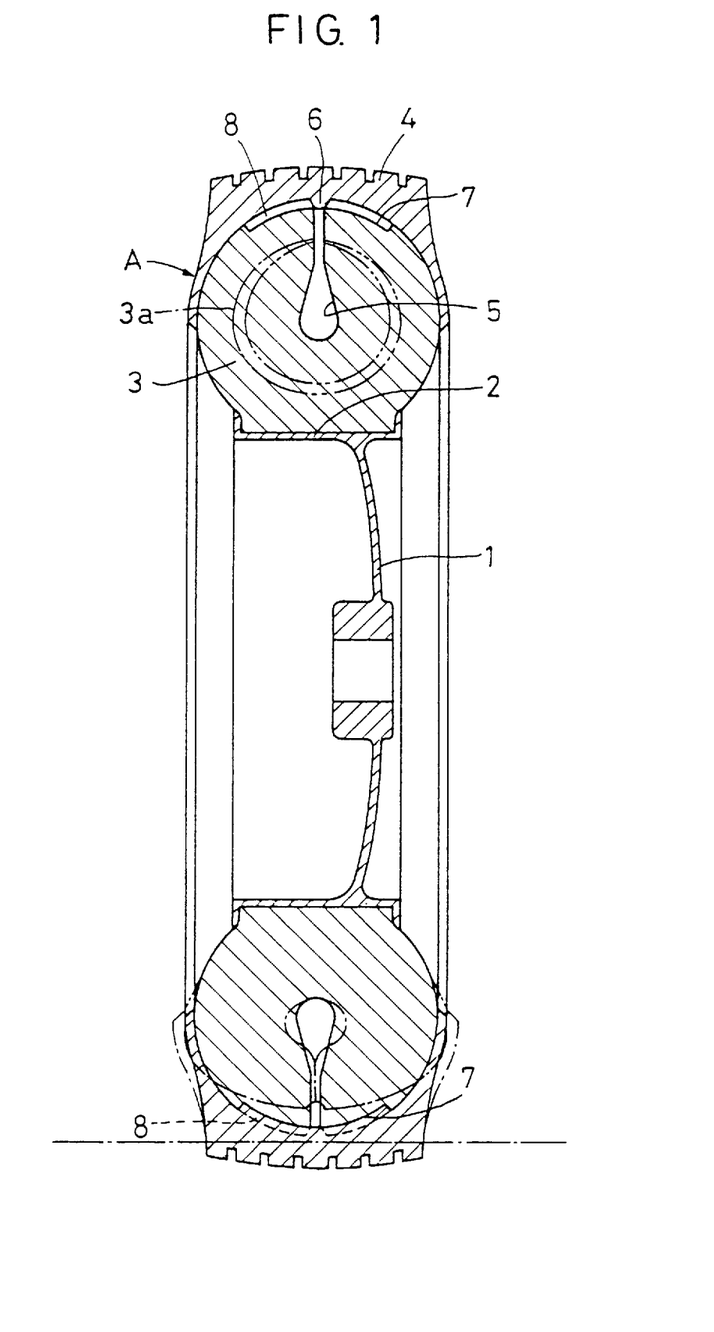
FIG. 1 is a sectional view of a first embodiment.

The annular rubber member 3 may be made of any kind of resilient material having a bending modulus and a resilient compression deformability which are determined according to the intended use of the tire. Urethane rubber is preferable as the material for the member 3, because its bending modulus and resilient compression deformability are easily adjustable by selecting suitable curing and foaming agents.

The peripheral groove 5 may be deeper or shallower than the illustrated example. That is, its bottom may be located nearer to the rim 2 than to the tread of the tire 4 or nearer to the tread of the tire 4 than to the rim 2. By changing the depth of the groove 5, it is possible to adjust the bending deformation strength of the annular rubber member 3 according to the intended use of the solid tire.

Figure 3A:
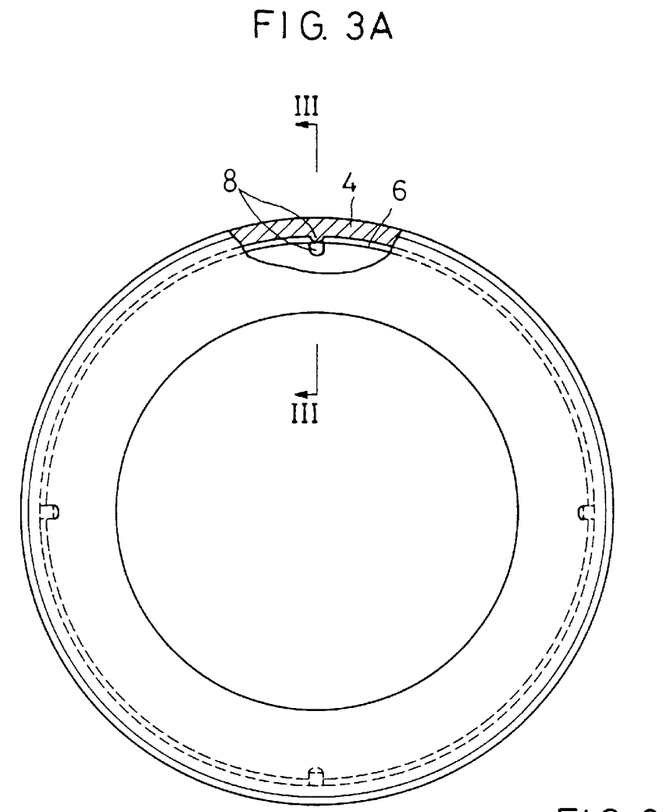
FIG. 3A is a partially cutaway side view of a tire of the first embodiment.
Figure 3B:
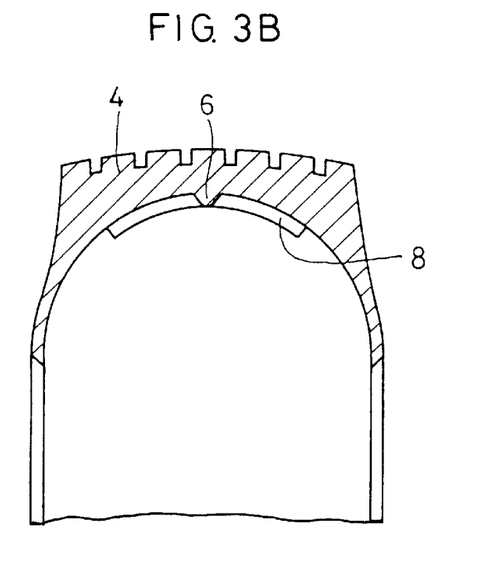
FIG. 3B is a sectional view taken along line III—III of FIG. 3A.

As shown in FIGS. 1 and 3A–3B, the tire 4 of the first embodiment has a rib 6 formed on the inner surface thereof and received in the peripheral groove 5 of the annular rubber member 3 to prevent axial displacement of the annular rubber member 3 relative to the tire 4.

Figure 2A:
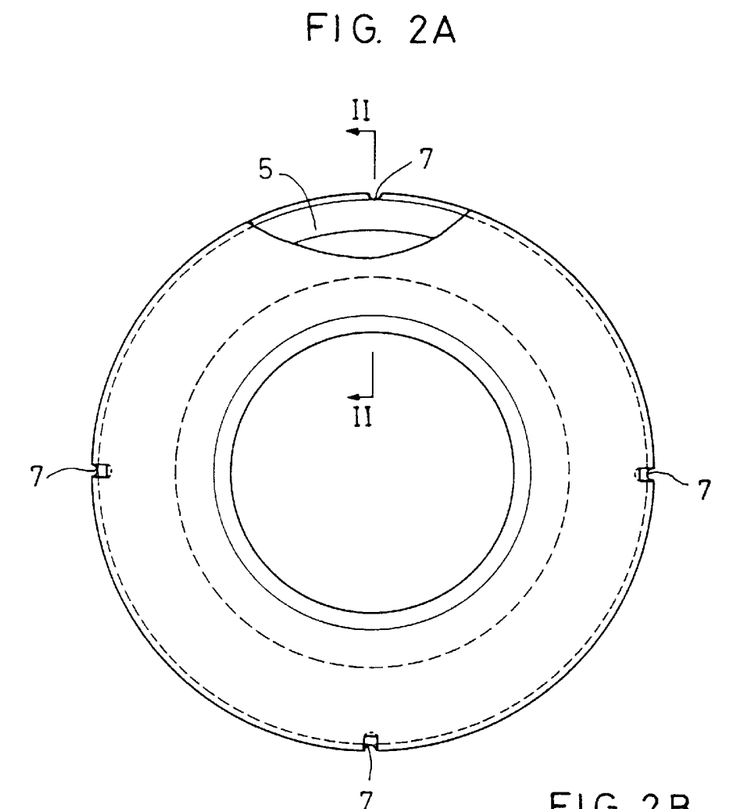
FIG. 2A is a partially cutaway sectional view of an annular rubber member of the first embodiment.
Figure 2B:
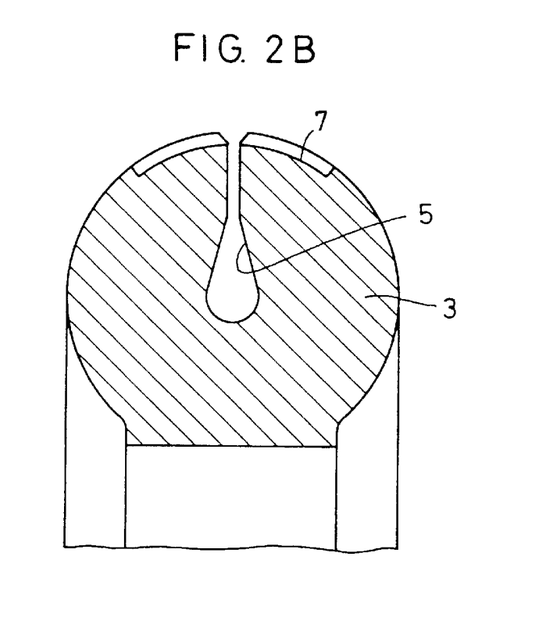
FIG. 2B is a sectional view taken along line II—II of FIG. 2A.

As shown in FIGS. 1 and 2A–2B, four axial elongated recesses 7 are formed in the outer surface of the annular rubber member 3 at 90° angular intervals. As shown in FIGS. 1 and 3, four axial ribs 8 formed on the inner surface of the tire 4 fit in the respective recesses 7.

By fitting the ribs 8 in the recesses 7, the tire 4 is prevented from slipping relative to the annular rubber member 3 while the latter is rotating with the rim 2. Thus, there will be no friction between the annular member 3 and the tire 4 and no frictional heat produced.

The tire 4, which is simply fitted on the annular rubber member 3, can be easily replaced with a new one when its tread pattern is worn out. This feature makes the solid tire of the present invention more economical than conventional one-piece solid tires. Since the tire 4 covers only the half of the outer portion of the annular rubber member 3, it can be easily fitted on or removed from the annular member 3.

When a load acts on the annular rubber member along the ridge on its outer surface as shown by chain line in FIG. 1, the portions of the rubber member 3 on both sides of the upper portion of the peripheral groove 5 are bent toward each other. When a larger load acts on the ridge, the entire rubber member is compressed in the tire 4 while being resiliently bent toward the deeper part of the peripheral groove.

Since this solid tire can softly bear a small load and bear a larger load with increased rigidity, it can absorb small vibrations caused by small undulations while the vehicle is traveling, and further bear a large load without transmitting vibrations to vehicle bodies.

If the solid tire is continuously subjected to a large load that causes the annular rubber member 3 to be deformed by 10–20% for a long time, the member 3 might suffer plastic (permanent) deformation. But it would be rarely deformed so markedly in a normal operation and even more rarely subjected to such a large load for such a long time as to suffer plastic deformation. But if it is desired to positively increase the elasticity to resist deformation, a substantially annular spring member 3a (with a bow-shaped section) may be embedded in the annular rubber member 3 (FIG. 1).

Figure 4:
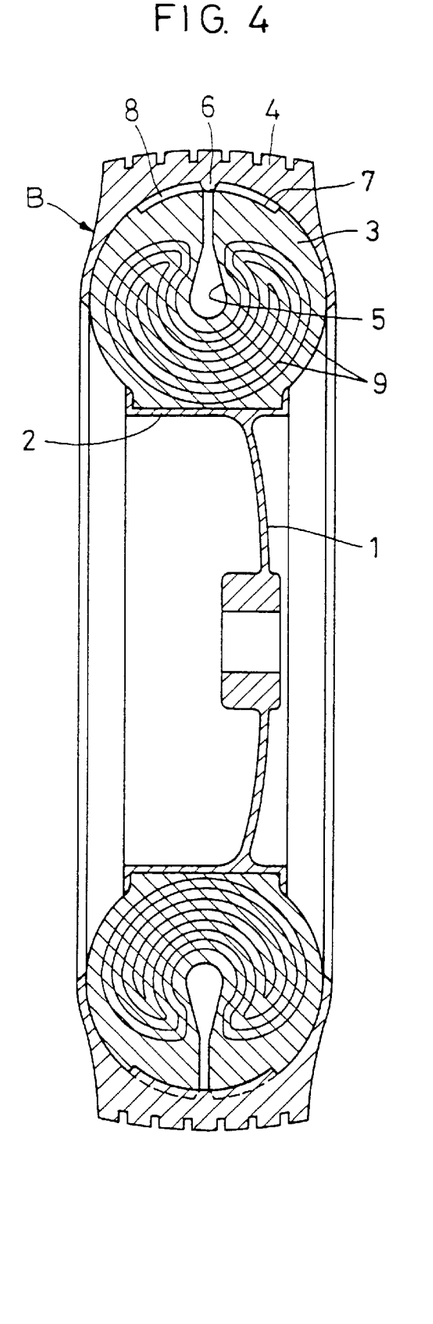
FIG. 4 is a sectional view of a second embodiment.

FIG. 4 shows a solid tire B of the second embodiment, which differs from the first embodiment in that a wire mesh 9 is embedded in the annular rubber member 3 so as to extend annularly therein. The wire mesh 9 may be one ordinarily used in a steel radial tire. It serves to increase the rigidity of the annular rubber member 3, especially at its portion near the rim 2, and thus to increase the load-bearing capacity of the solid tire B.

Figure 5:
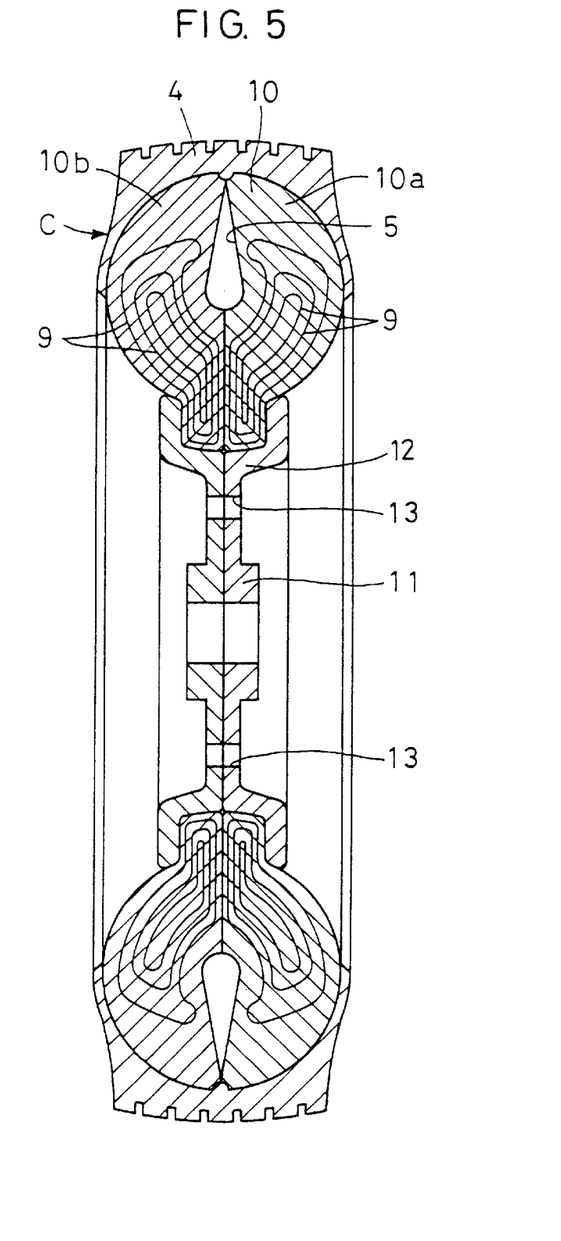
FIG. 5 is a sectional view of a third embodiment.

FIG. 5 shows a solid tire C of the third embodiment, which differs from the first embodiment in that the annular rubber member 10 comprises two separate parts 10a and 10b split in the axial direction of the tire and each having a wire mesh 9 embedded therein.

The annular rubber member 10 comprising two or more split parts can be mounted in the tire more easily, so that the solid tire of this embodiment can be assembled easily. The wheel 11 of this embodiment comprises two disks having rims 12. With the split parts 10a and 10b of the annular rubber member 10 sandwiched between the rims 12, the disks are fastened together with bolts and nuts to couple the split parts 10a and 10b together. But the split parts 10a and 10b may be coupled together by any other known means such as by bonding.

Since the wire mesh 9 is embedded in each of the split parts 10a and 10b extends annularly, its density is high near the rim 12, so that the rubber member 10 is higher in mechanical strength and less deformable at its portion nearer to the rim 2.

Figure 6:
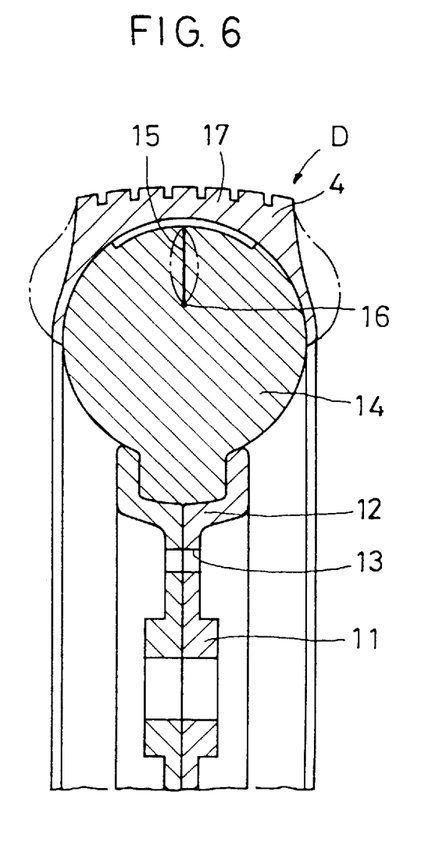
FIG. 6 is a partial sectional view of a fourth embodiment.

FIG. 6 shows a solid tire D of the fourth embodiment. It has a hollow tire 4 fitted on an annular rubber member 14 having an annular slit 15 formed in the outer surface thereof along its ridge. Other elements are the same and thus indicated by the same numerals as those in the third embodiment.

The slit 15 is usually 1–10 mm wide but may be a mere cut. A circular groove-shaped hollow 16 should be formed at the inner end of the slit 15 to prevent cracks from developing from the end of the slit 15.

As shown by chain line in FIG. 6, when a relatively small load is applied to the tread 17, the tire 4 and the annular rubber member 14 are resiliently deformed so that the slit 15 opens. When a larger load is applied to the tread 17, the slit will be deformed and at the same time, the entire annular rubber member 14 will be compressed to bear the large load.

Figure 7:
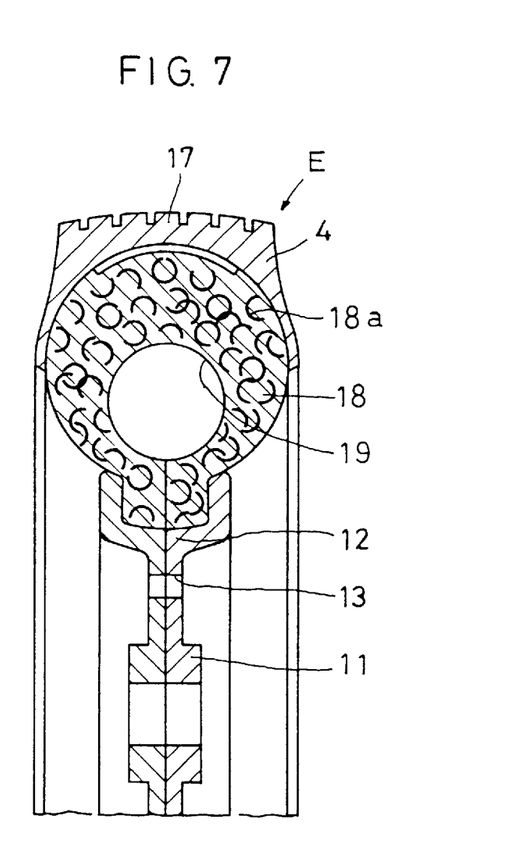
FIG. 7 is a partial sectional view of a fifth embodiment.

FIG. 7 shows a solid tire E of the fifth embodiment. It has a tire 4 fitted around an annular rubber member 18 having an annular hollow 19 circling through the member at a position nearer to the rim so that the annular rubber member 18 is thinner at its portion nearer to the rim than at its portion nearer to the tread.

In this arrangement, when a relatively small impulsive load is applied, the thin portion of the annular rubber member 18, i.e. the portion nearer to the rim, is resiliently deformed to cushion the shock. When a large load is applied continuously for a long time, the entire annular rubber member 18, including its thick portion, is compressed in the tire 4.

In order to increase the load-bearing capacity of the annular rubber member 18, a spring member 3a as used in the first embodiment shown in FIG. 1 or a wire mesh may be embedded in the member 18. For the same purpose, metal springs, glass fiber, cloth or carbon fiber may be embedded. Otherwise, the annular rubber member 18 may be made from a fiber-reinforced resin. Numeral 18a in FIG. 7 indicates spiral or bow-shaped solid wires obtained by untwisting a wire rope of steel or special steel. Their thickness and length should be determined taking into account the required load-bearing capacity.

By reinforcing the rubber member 18 in the above manner, it is possible to increase its load-bearing capacity to a level at which the possibility of permanent deformation under a large load is nil and thus to increase the toughness of the tire. The annular rubber member of any embodiment of this invention may be reinforced in the above manner.

Figure 8:
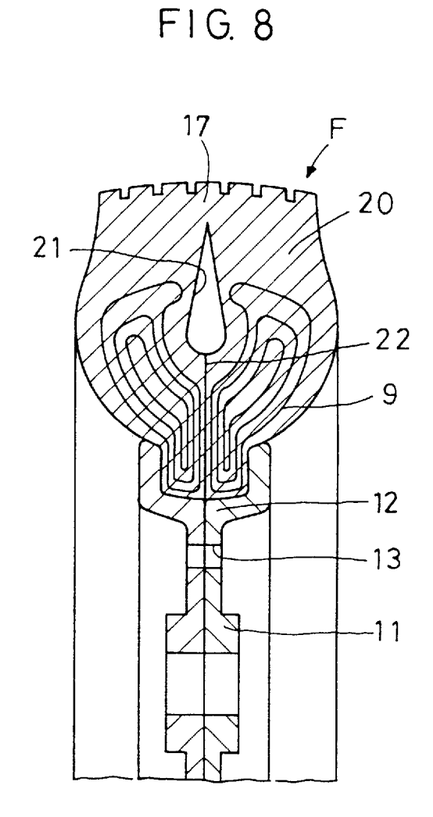
FIG. 8 is a partial sectional view of a sixth embodiment.

FIG. 8 shows a solid tire F of the sixth embodiment, in which the tread 17 is an integral Dart of the annular rubber member 20. The rubber member 20 has a hollow 21 having a substantially fan-shaped section and extending circumferentially through the member 20 at a position nearer to the tread so that the member 20 is thinner at its portion nearer to the tread 17 than at its portion nearer to the rim 12. The annular rubber member 20 of the sixth embodiment has a cut 22 extending from the inner end of the hollow 21 to the rim 12. The hollow 21 is formed by a mold inserted through the cut 22.

Figure 9:
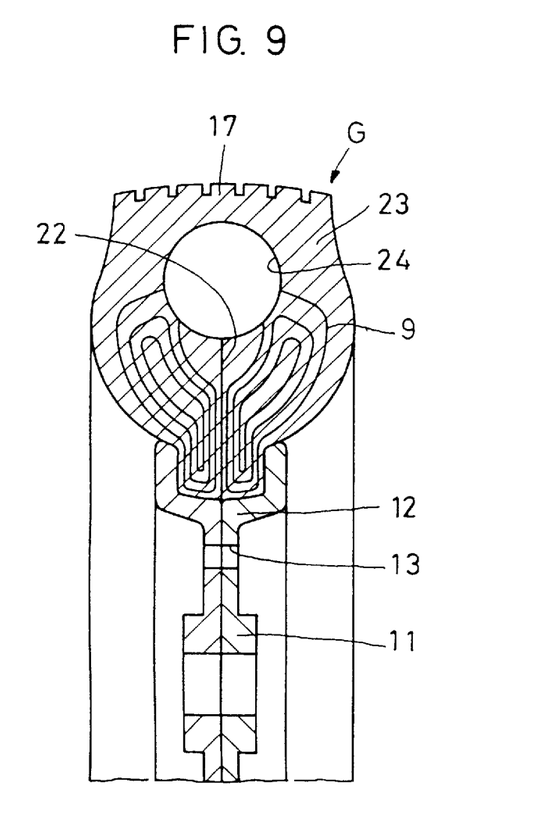
FIG. 9 is a partial sectional view of a seventh embodiment.

FIG. 9 shows a solid tire G of the seventh embodiment, in which the tread 17 is an integral part of the annular rubber member 23. The rubber member 23 has a hollow 24 circling through the member 23 at a position nearer to the tread so that the member 23 is thinner at its portion nearer to the tread than at its portion nearer to the rim.

When a small load is applied to the solid tire F or G, the thin portion of the annular rubber member 20 or 23, i.e. its portion nearer to the tread, is resiliently deformed to cushion the shock. When a larger load is applied, the entire rubber member 20 or 23 including its thick portion near the rim, is resiliently deformed.

Figure 10:
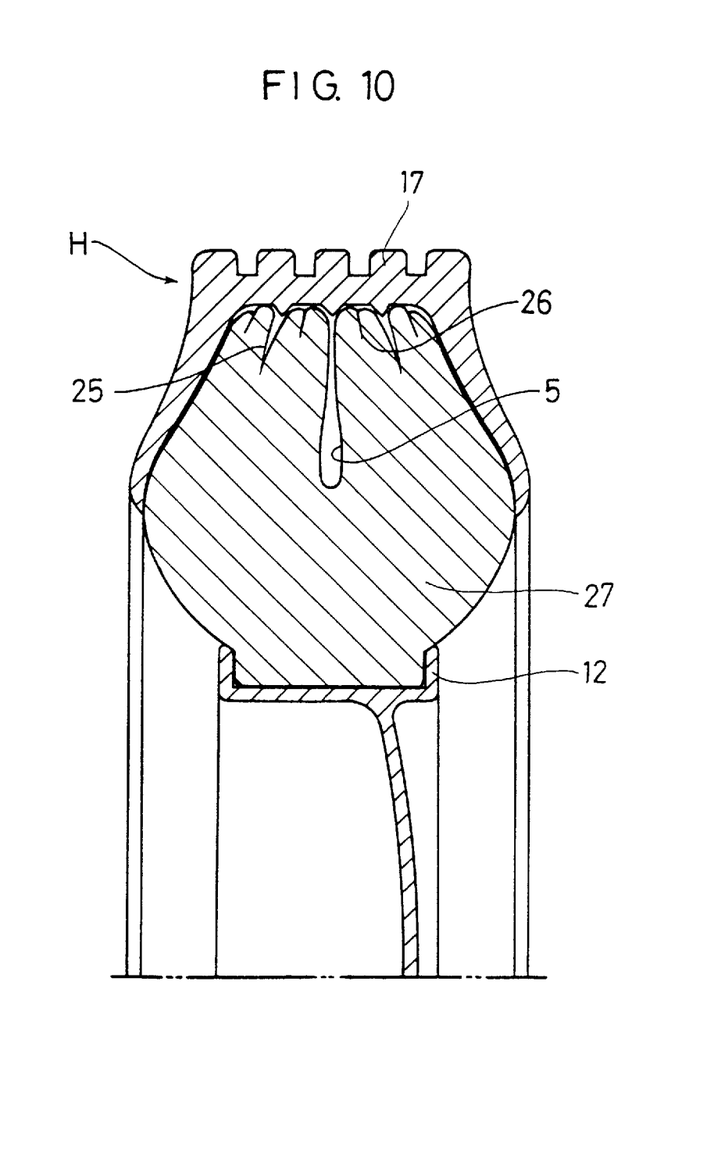
FIG. 10 is a partial sectional view of an eighth embodiment.

FIG. 10 shows a solid tire H of the eighth embodiment, in which a plurality of long and short slits 25 and 26 are formed in the outer surface of the annular rubber member 27, on both sides of the groove 5 so that the annular member can absorb shocks more effectively.

In any of the embodiments, the annular rubber member can softly bear a small load and bear a larger load with correspondingly increased rigidity.

The solid tire of this invention can absorb shocks sufficiently even while the vehicle is traveling with no cargo. Thus, the driver is less likely to be tired.

The same effects are achievable in the arrangement in which the annular rubber member has a slit formed in the outer surface thereof so as to extend along a ridge circling the outer surface of the annular rubber member, and in the arrangement in which the annular rubber member has an annular hollow circling through the annular rubber member at a position nearer to the rim or the tread of the tire so that the annular rubber member is thinner at its portion nearer to the rim or the tread than at its portion nearer to the tread or the rim.

In the arrangement in which the tire is detachably mounted around the annular rubber member, the tire can be replaced when its tread is worn out. This solid tire is thus economically advantageous over conventional integrally molded solid tires.

What is claimed is:

1. A solid tire comprising:
    an annular rubber member adapted to be mounted on a rim of a wheel; and
    a tire detachably fitted on an outer peripheral surface of said annular rubber member in order to cover only a part of said outer peripheral surface of said annular rubber member,
    said annular rubber member having an annular groove which is open along an outer circumferential location of said annular rubber member, wherein said annular groove has an enlarged inner circumferential end.

2. The solid tire as claimed in claim 1, further comprising:
    a plurality of recesses formed in one of said outer peripheral surface of said annular rubber member and an inner peripheral surface of said tire, wherein said recesses are circumferentially spaced from each other; and
    a plurality of protrusions formed on the other of said outer peripheral surface of said annular rubber member and said inner peripheral surface of said tire and located so as to be received in said recesses, respectively.

3. The solid tire as claimed in claim 1, wherein said annular rubber member is split along a radial direction of said tire so as to be formed in two separate pieces.

4. The solid tire as claimed in claim 1, further comprising wire mesh embedded in said annular rubber member.

5. The solid tire as claimed in claim 1, wherein said tire includes an annular rib formed on an inner peripheral surface thereof, said annular rib being aligned with said annular groove formed in said annular rubber member.

6. The solid tire as claimed in claim 5, further comprising:

a plurality of recesses formed in one of said outer peripheral surface of said annular rubber member and an inner peripheral surface of said tire, wherein said recesses are circumferentially spaced from each other; and a plurality of protrusions formed on the other of said outer peripheral surface of said annular rubber member and said inner peripheral surface of said tire and located so as to be received in said recesses, respectively.

7. The solid tire as claimed in claim 5, wherein said annular rubber member is split along a radial direction of said tire so as to be formed in two pieces.

8. The solid tire as claimed in claim 5, further comprising wire mesh embedded in said annular rubber member.

9. The solid tire as claimed in claim 1, wherein said annular rubber member has a substantially circular cross section.

10. The solid tire as claimed in claim 1, wherein said tire is supported by direct engagement with said outer peripheral surface of said annular rubber member.

11. A solid tire comprising:

an annular rubber member adapted to be fitted directly on a rim of a wheel; and a tire detachably fitted on an outer peripheral surface of said annular rubber member in order to cover only a part of said outer peripheral surface of said annular rubber member, said annular rubber member having an annular slit extending from a central outer peripheral surface of said annular rubber member toward a central axis of said tire.

12. The solid tire as claimed in claim 11, further comprising:

a plurality of recesses formed in one of said outer peripheral surface of said annular rubber member and an inner peripheral surface of said tire, wherein said recesses are circumferentially spaced from each other; and a plurality of protrusions formed on the other of said outer peripheral surface of said annular rubber member and said inner peripheral surface of said tire and located so as to be received in said recesses, respectively.

13. The solid tire as claimed in claim 11, wherein said annular rubber member is split along radial direction of said tire so as to be formed in two separate pieces.

14. The solid tire as claimed in claim 11, further comprising wire mesh embedded in said annular rubber member.

15. The solid tire as claimed in claim 11, wherein said annular rubber member has a substantially circular cross section.

16. The solid tire as claimed in claim 11, wherein said tire is supported by direct engagement with said outer peripheral surface of said annular rubber member.

\* \* \* \* \*